United States Patent
Gu et al.

(10) Patent No.: US 7,491,076 B2
(45) Date of Patent: *Feb. 17, 2009

(54) ROTATABLE MEMORY CARD WITH IMPROVED LOCKING MECHANISM

(75) Inventors: Hao Gu, Kunshan (CN); Qi-Sheng Zheng, Kunshan (CN); Zhi-Quan Mou, Kunshan (CN); Xiao-Hai Zhou, Kunshan (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

This patent is subject to a terminal disclaimer.

(21) Appl. No.: 11/787,923

(22) Filed: Apr. 18, 2007

(65) Prior Publication Data

US 2007/0243733 A1   Oct. 18, 2007

(51) Int. Cl.
*H01R 27/00* (2006.01)

(52) U.S. Cl. .................... 439/217; 439/131

(58) Field of Classification Search ............. 439/131, 439/936, 135, 136, 142, 217, 165, 946
See application file for complete search history.

(56) References Cited

U.S. PATENT DOCUMENTS

| | | | | |
|---|---|---|---|---|
| 6,518,927 B2* | 2/2003 | Schremmer et al. | ......... | 343/702 |
| 6,567,273 B1* | 5/2003 | Liu et al. | .................... | 361/737 |
| 6,676,420 B1* | 1/2004 | Liu et al. | .................... | 439/131 |
| 6,744,634 B2* | 6/2004 | Yen | ............................ | 361/752 |
| 6,813,164 B2* | 11/2004 | Yen | ............................ | 361/785 |
| 6,883,718 B1* | 4/2005 | Le et al. | ...................... | 235/492 |
| 6,890,188 B1* | 5/2005 | Le | .............................. | 439/76.1 |
| 6,908,038 B1* | 6/2005 | Le | .............................. | 235/492 |
| 6,944,028 B1* | 9/2005 | Yu et al. | ...................... | 361/737 |
| 7,104,809 B1* | 9/2006 | Huang | ....................... | 439/76.1 |
| 7,152,801 B2* | 12/2006 | Cuellar et al. | ............... | 235/492 |
| 7,218,528 B2* | 5/2007 | Chen | .......................... | 361/737 |
| 7,310,692 B2* | 12/2007 | Miller et al. | .................. | 710/11 |
| 2005/0037647 A1* | 2/2005 | Le | .............................. | 439/131 |
| 2005/0230483 A1* | 10/2005 | Miller et al. | ................ | 235/492 |
| 2005/0230484 A1* | 10/2005 | Cuellar et al. | ............... | 235/492 |
| 2006/0084287 A1* | 4/2006 | Miller et al. | .................. | 439/64 |
| 2006/0282553 A1* | 12/2006 | Miller et al. | ................. | 710/11 |
| 2007/0099511 A1* | 5/2007 | Miller et al. | ................ | 439/630 |
| 2007/0125869 A1* | 6/2007 | Chuang | ..................... | 235/492 |
| 2007/0161301 A1* | 7/2007 | Chuang | ..................... | 439/946 |
| 2007/0243732 A1* | 10/2007 | Gu et al. | ..................... | 439/131 |
| 2007/0243733 A1* | 10/2007 | Gu et al. | ..................... | 439/131 |
| 2007/0252010 A1* | 11/2007 | Gonzalez et al. | ........... | 235/492 |

* cited by examiner

*Primary Examiner*—Ross N Gushi
(74) *Attorney, Agent, or Firm*—Wei Te Chung (57) ABSTRACT

A memory card (100) includes a main body portion (1) and a rotatable portion (2) connected by a pair of hinges (3) to rotate around an axis extending across a width of the memory card. A conductive member (12) includes a base (121) retained in the main body portion (1) to form a SD card interface and an extension (122) extending beyond the main body portion to form a USB plug interface. The rotatable portion has a pair of slots (2117), a pair of coiled springs (24) and a slider (22) movably received in the slots. The slider (22) includes a locking projection (2215) mating with a distal end (123) of the extension at a closed position and abutting against the distal end to expose the second interface at an opened position.

16 Claims, 9 Drawing Sheets

ROTATABLE MEMORY CARD WITH IMPROVED LOCKING MECHANISM

CROSS-REFERENCE TO RELATED APPLICATIONS

Relevant subject matters are disclosed in a contemporaneously filed application with the same title, and are assigned to the same applicant and the same assignee with the instant invention.

BACKGROUND OF THE INVENTION

1. Field of the Invention

This invention generally relates to a memory card, and more particularly to a rotatable memory card with a locking mechanism.

2. Description of the Prior Art

Nowadays, memory cards, such as CF cards, MMC cards, SD cards, mini SD cards, MS cards and TF cards etc., have been widely used with personal computers, cellular telephones, personal digital assistants (PDAs), digital still cameras (DSCs) etc. to store large amounts of data. Memory cards of a same type may be interchanged in a complementary card slot designed to accept that type of the memory cards. However, the development of memory card standards has created different types of memory cards that are incompatible with each other in various degrees. A memory card made according to one standard is usually not compatible with a host designed to operate with a memory card of another standard.

The memory cards have been made to interface with a computer or other type of electrical devices through a Universal Serial Bus (USB) connector. These are especially convenient for users who have one or more USB connectors available on the front of their personal computers, particularly of a receptacle slot for one of the above standard memory cards is not present.

U.S. Patent Application Publication No. 2006/0084287 A1 discloses such a memory card comprising a stationary portion and a cover attached to the stationary portion by a pair of rigid hinges. The memory card comprises a first interface retained in the stationary portion and a second interface extending beyond the stationary portion along a longitudinal direction thereof. The first and second interfaces are adapted to mate with standard SD card slot and USB receptacle, respectively. The cover can be rotated with respect to the stationary portion approximately one-hundred eighty degrees between closed and opened positions. The cover defines a depression to receive the second interface at the closed position. Besides, in order to make the second interface stably received in the depression to prevent it from being exposed accidentally, the cover comprises a hook rigidly abutting against a distal end of the second interface at the closed position. However, the second interface may easily be damaged due to a long-term rigidly engagement between the hook and the second interface, thereby shorten the usage life of the memory card.

Hence, it is desired to have a memory card solving the problem above.

BRIEF SUMMARY OF THE INVENTION

Accordingly, an object of the present invention is to provide a memory card with flexible locking mechanism to mate with an interface for reliable protection.

In order to attain the objective above, a memory card comprises a main body portion and a rotatable portion connected by a pair of hinges so that the rotatable portion can rotate around an axis extending across a width direction of the memory card. A conductive member includes a base retained in the main body portion with a plurality of first contacts to form a first interface and an extension extending beyond the main body portion with a plurality of second contacts to form a second interface. The rotatable portion comprises a receiving chamber for mating with the extension, a pair of slots located on opposite lateral sides of the receiving chamber, a pair of coiled springs and a slider movably received in the slots. Each coiled spring comprises one end mating with the slider and the other end abutting against the slot. The slider comprises a locking projection pressing a distal end of the extension at a closed position. In this condition, the memory card can be inserted into and removed from a first receptacle. When it is desired to insert the memory card into a second receptacle different from the first receptacle, the slider is movable in the slots along a longitudinal direction by an engagement force between the distal end and the locking projection. The locking projection slides away from an upper slant wall of the distal end. As a result, the second interface is exposed at an opened position. When the rotatable portion pivots around the axis, the engagement between the distal end of the extension and the locking projection is flexible via the movement of the slider along the longitudinal direction of the memory card, thereby the second interface can't be easily damaged.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT OF THE INVENTION

Reference will now be made in detail to the preferred embodiment of the present invention.

Referring to FIGS. 1-4, a memory card 100 extends in a longitudinal direction and comprises a main body portion 1, a conductive member 12 with a base 121 retained in the main body portion 1 and a substantially rectangular shaped extension 122 extending beyond the main body portion 1, and a rotatable portion 2 connected by a pair of hinges 3.

The main body portion 1 comprises a first bottom cover 11 and a first top cover 13 covering the first bottom cover 11. The first bottom cover 11 defines a first receiving chamber 111 to receive the base 121 of the conductive member 12 and a plurality of rectangular shaped through holes 112 at a front end thereof. The through holes 112 are located along a width direction of the memory card 100 perpendicular to the longitudinal direction. A pair of first protrusions 113 each with a cross-shaped depression 114 defined therein (shown in FIG. 7) are located at a back end of the bottom cover 11. The first top cover 13 is configured to the first bottom cover 11 and comprises a pair of slits 131 corresponding to the depressions 114 for mating with the hinges 3.

Figure 5:
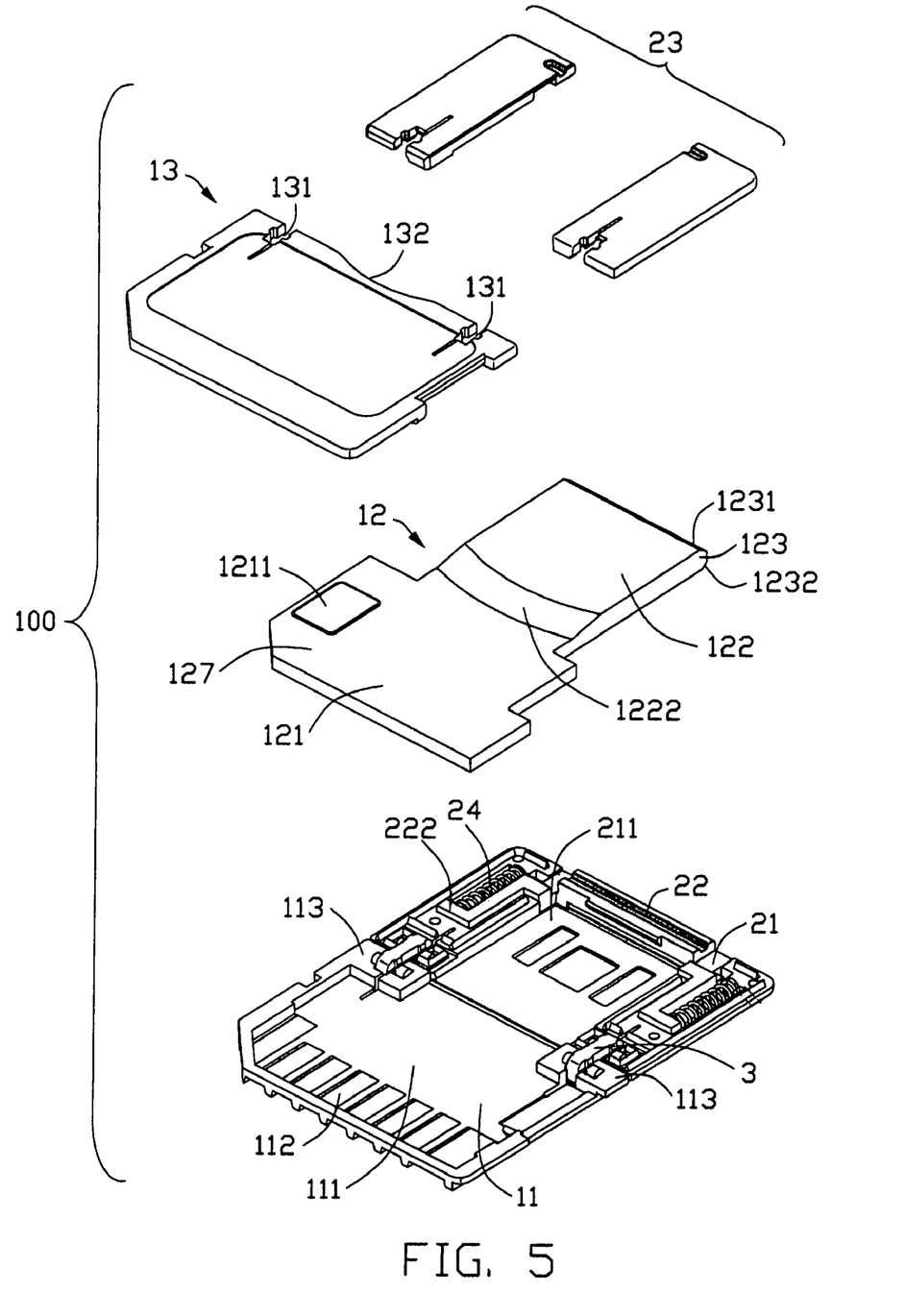
FIG. 5 is an exploded view of the memory card shown in FIG. 1.
Figure 6:
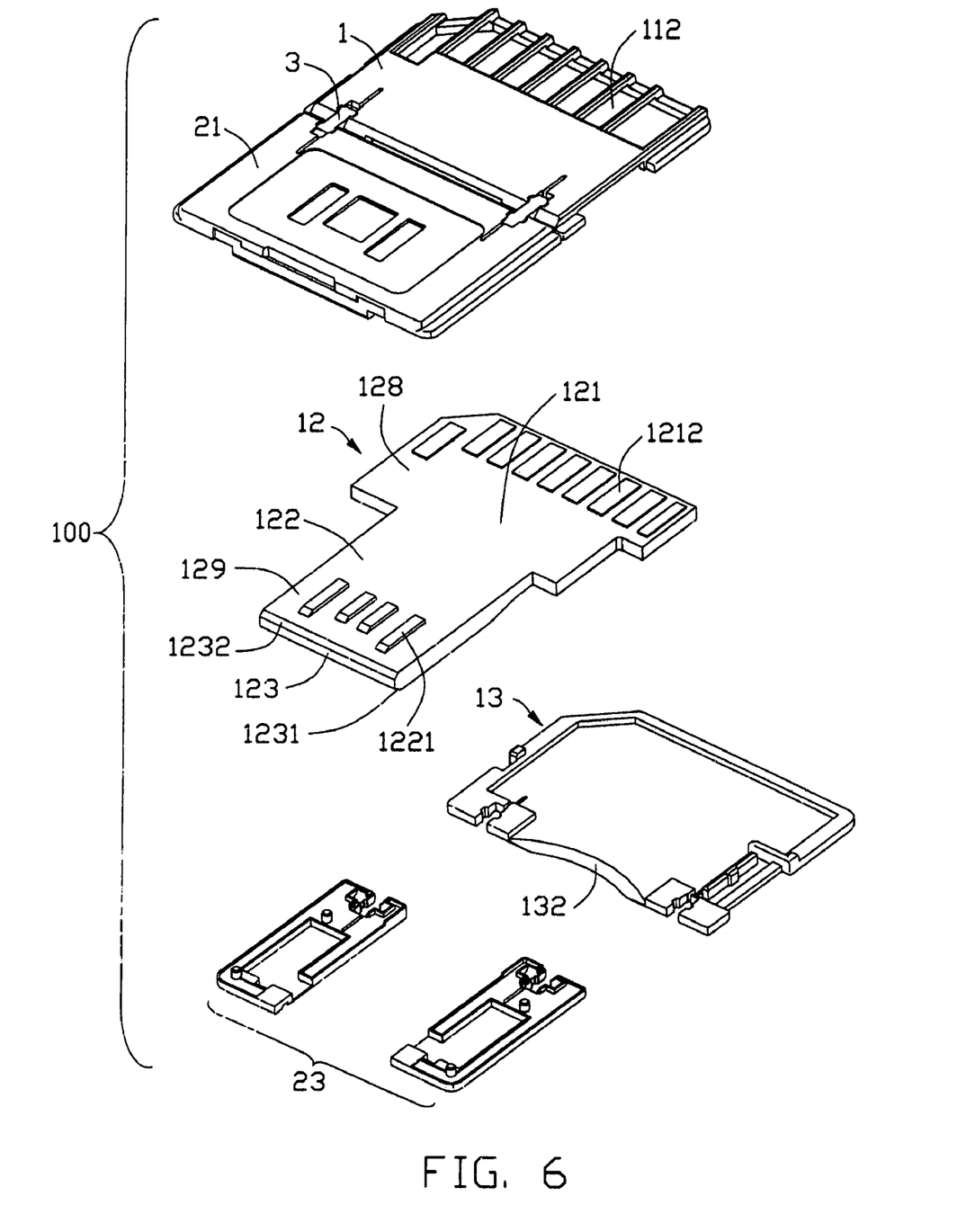
FIG. 6 is another exploded view of the memory card shown in FIG. 2.
Figure 9:
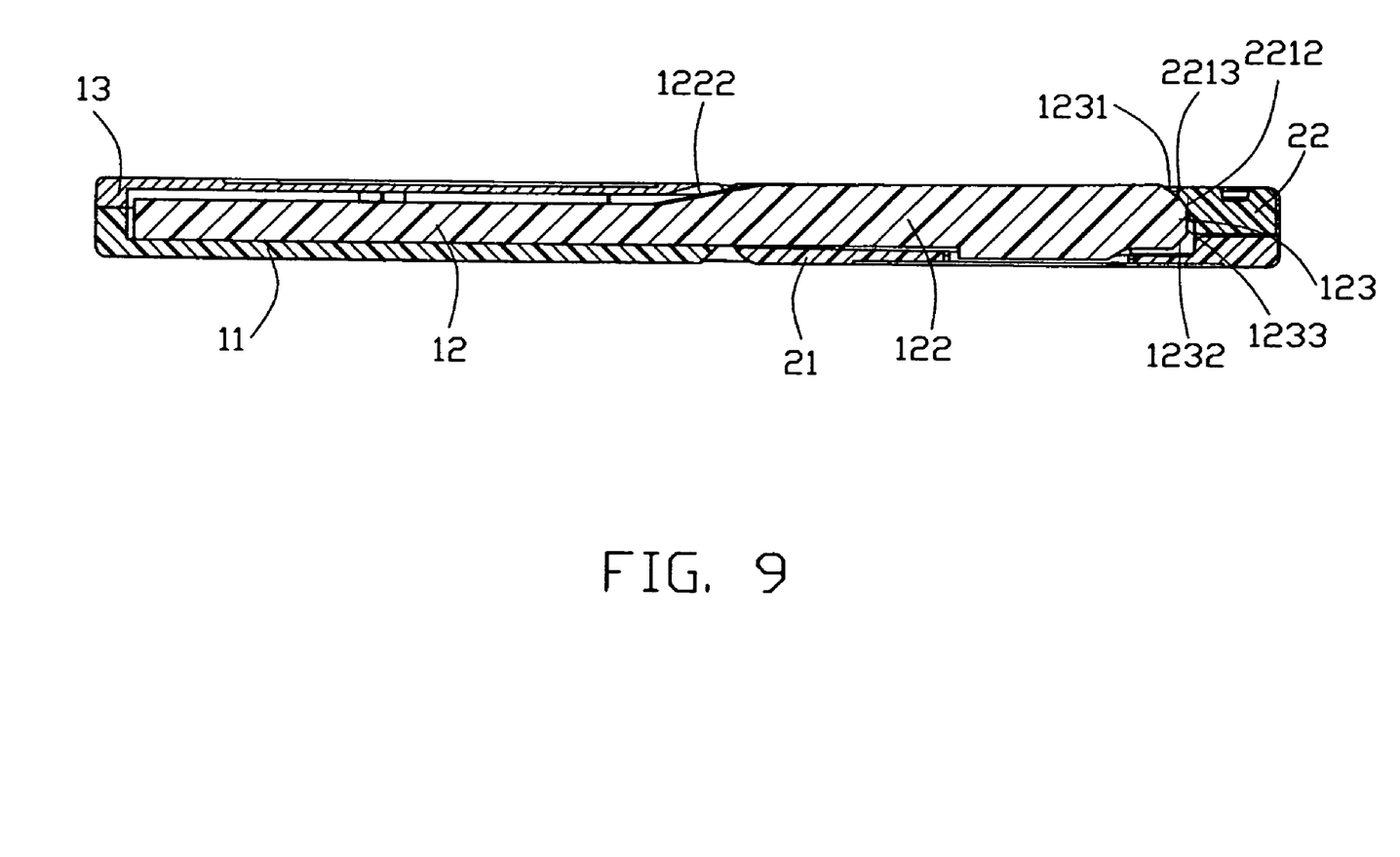
FIG. 9 is a cross-sectional view of the memory card taken along line 8-8 of FIG. 1.

Referring to FIGS. 5-6, the conductive member 12 in the preferred embodiment is a printed circuit board (PCB). The base 121 comprises a memory chip 1211 formed on a top surface 127 thereof and a plurality of first contacts 1212 formed on a bottom surface 128 corresponding to the through holes 112 of the first bottom cover 11. The extension 122 integrally extends from the base 121 along the longitudinal direction wherein the extension 122 is narrower and thicker than the base 121. The extension 122 comprises a plurality of second contacts 1221 on a flat surface 129 coplanar with the bottom surface 128 of the base 121. The first and second contacts 1212, 1221 are positioned on the same side of the conductive member 12 of this example memory card 100 but they could alternately be placed on opposite sides. The extension 122 has a slant surface 1222 on another flat surface 126 opposite to the flat surface 129. The slant surface 1222 is adjacent to the base 121 and connects with the top surface 127 of the base 121. The first top cover 13 comprises a corresponding slant face 132 between the slits 131 for mating with the slant surface 1222. The extension 122 further comprises a contractive portion 123 at a distal end thereof opposite to the slant surface 1222. The contractive portion 123 is composed of an upper slant wall 1231, a lower slant wall 1232 and a vertical wall 1233 connecting the upper and lower slant walls 1231, 1232 as shown in FIG. 9. The first and second contacts 1212, 1221 electrically connect with the memory chip 1211, respectively for signal transmission.

Figure 1:
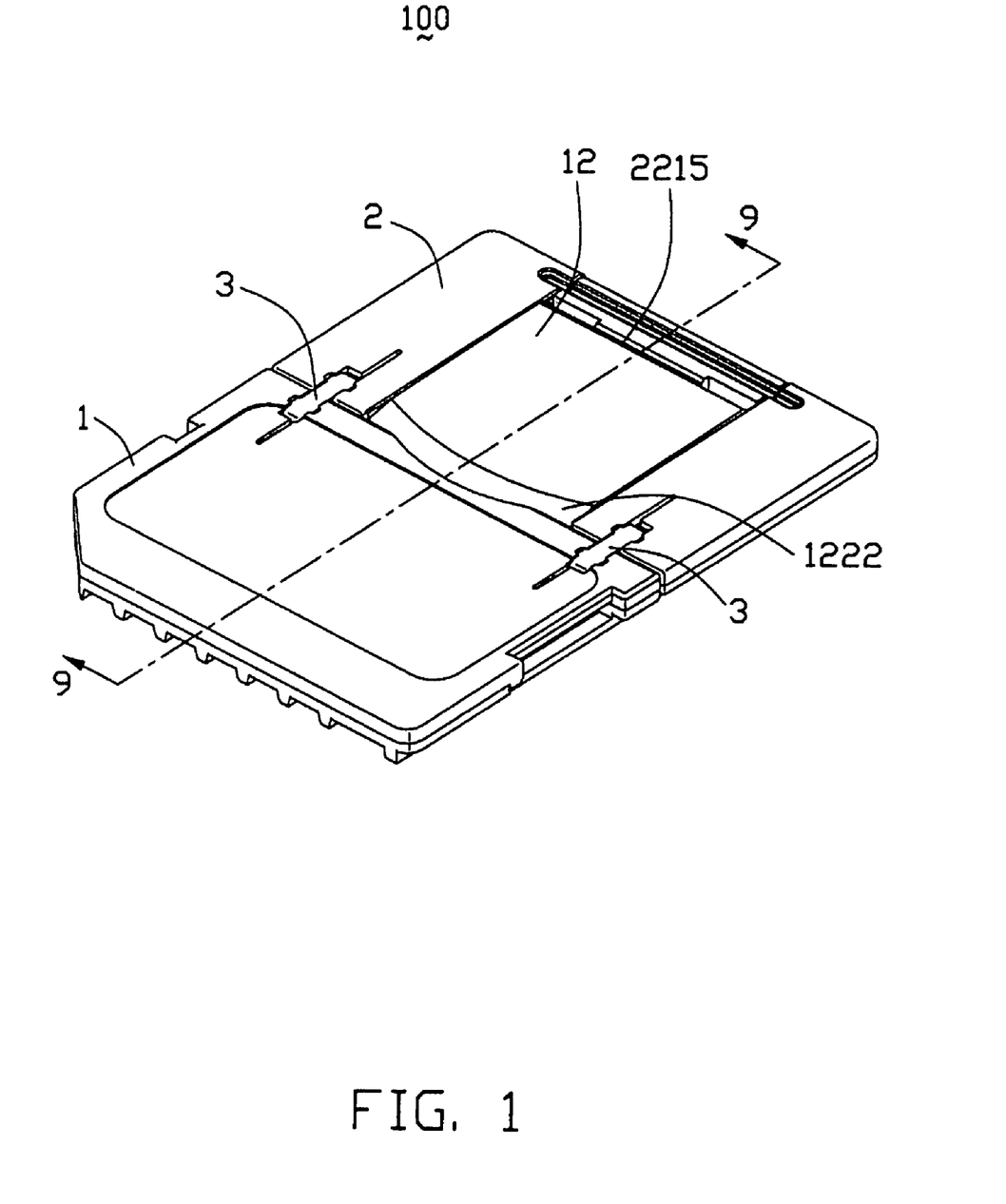
FIG. 1 is a perspective view of a memory card having a first and a second interfaces at a closed position, and with the second interface hide in a cover according to a preferred embodiment of the present invention.
Figure 2:
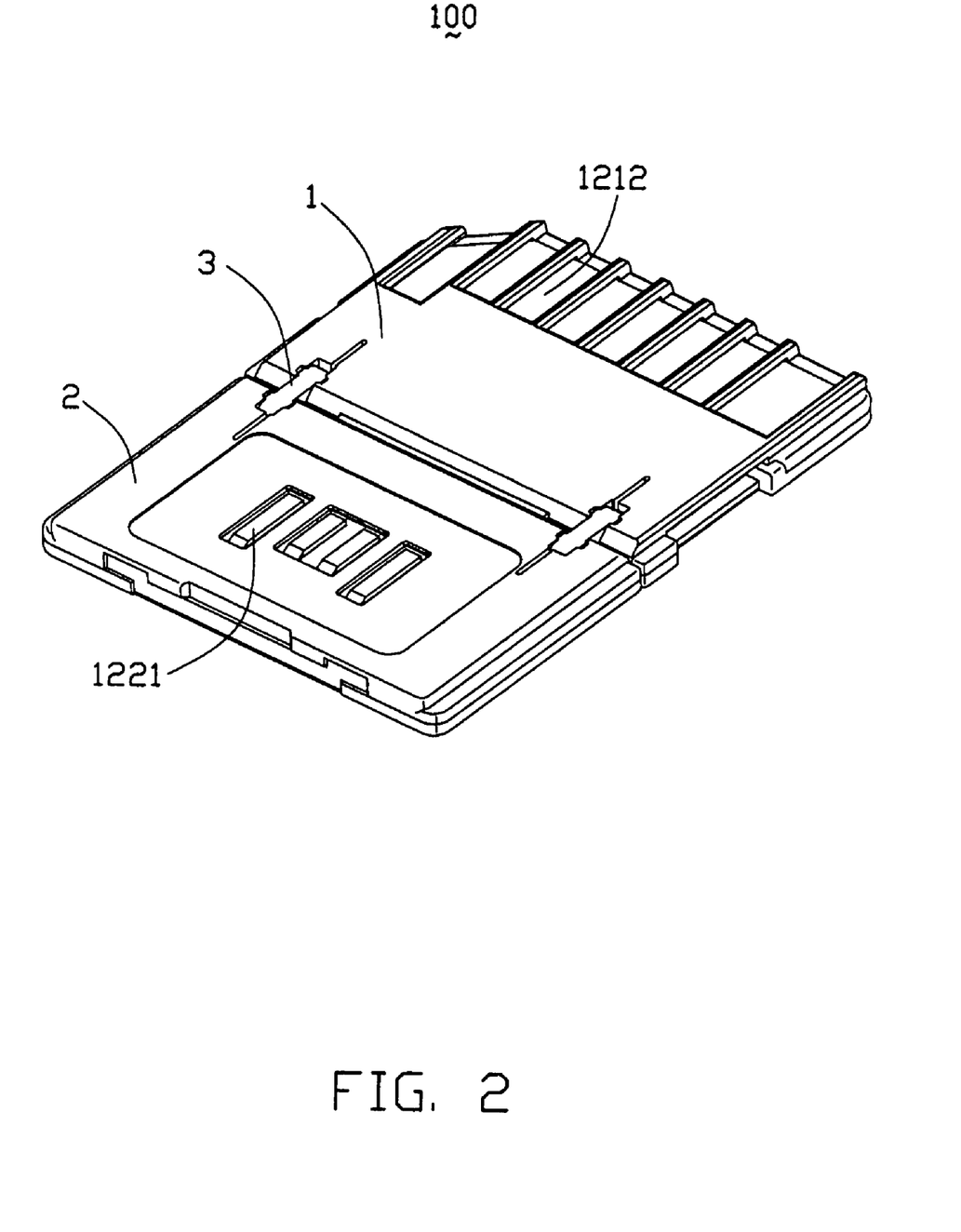
FIG. 2 is another perspective view similar to FIG. 1, while taken from another aspect.
Figure 3:
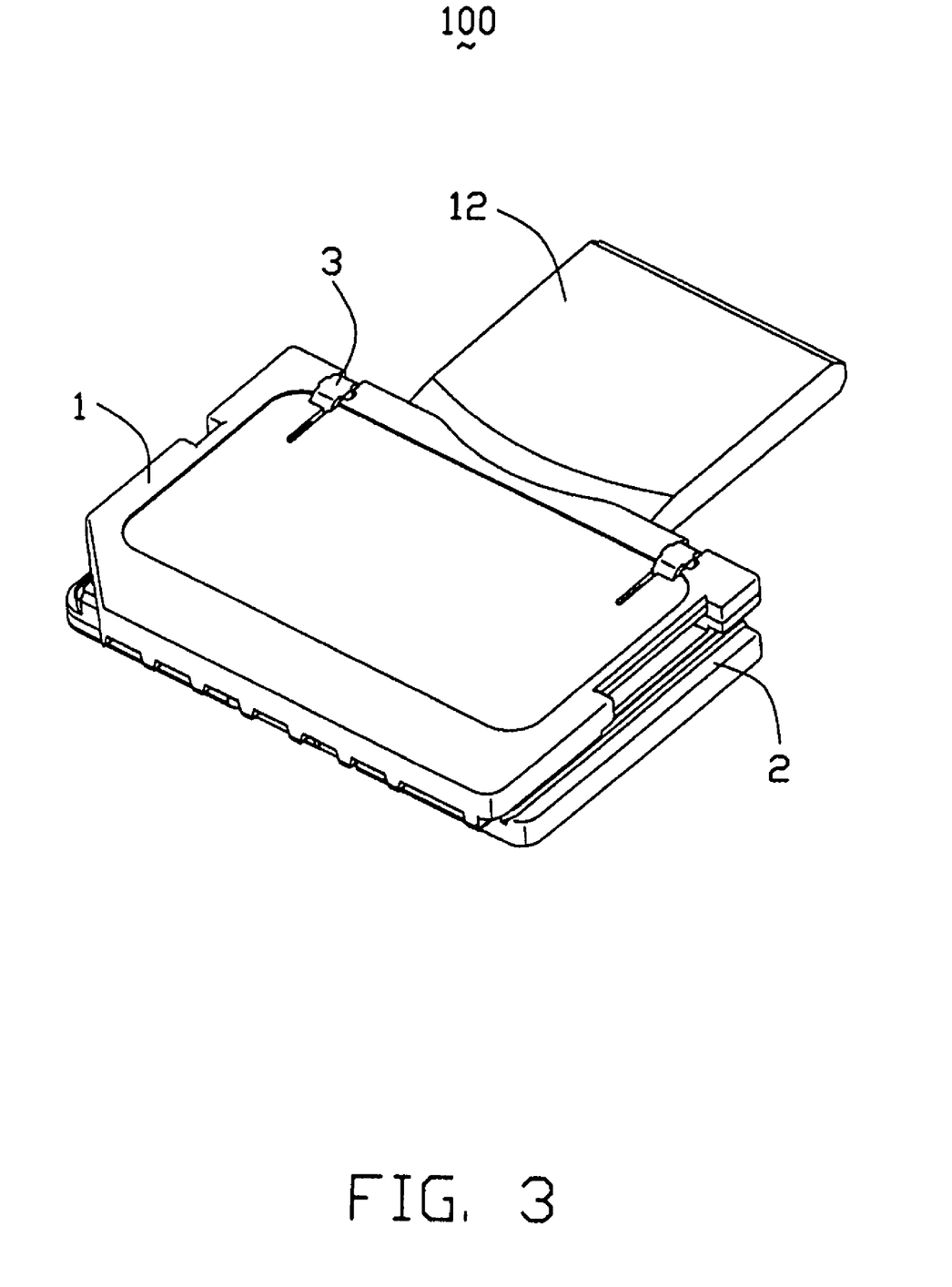
FIG. 3 is a perspective view of the memory card at an opened position with the second interface exposed outside.
Figure 4:
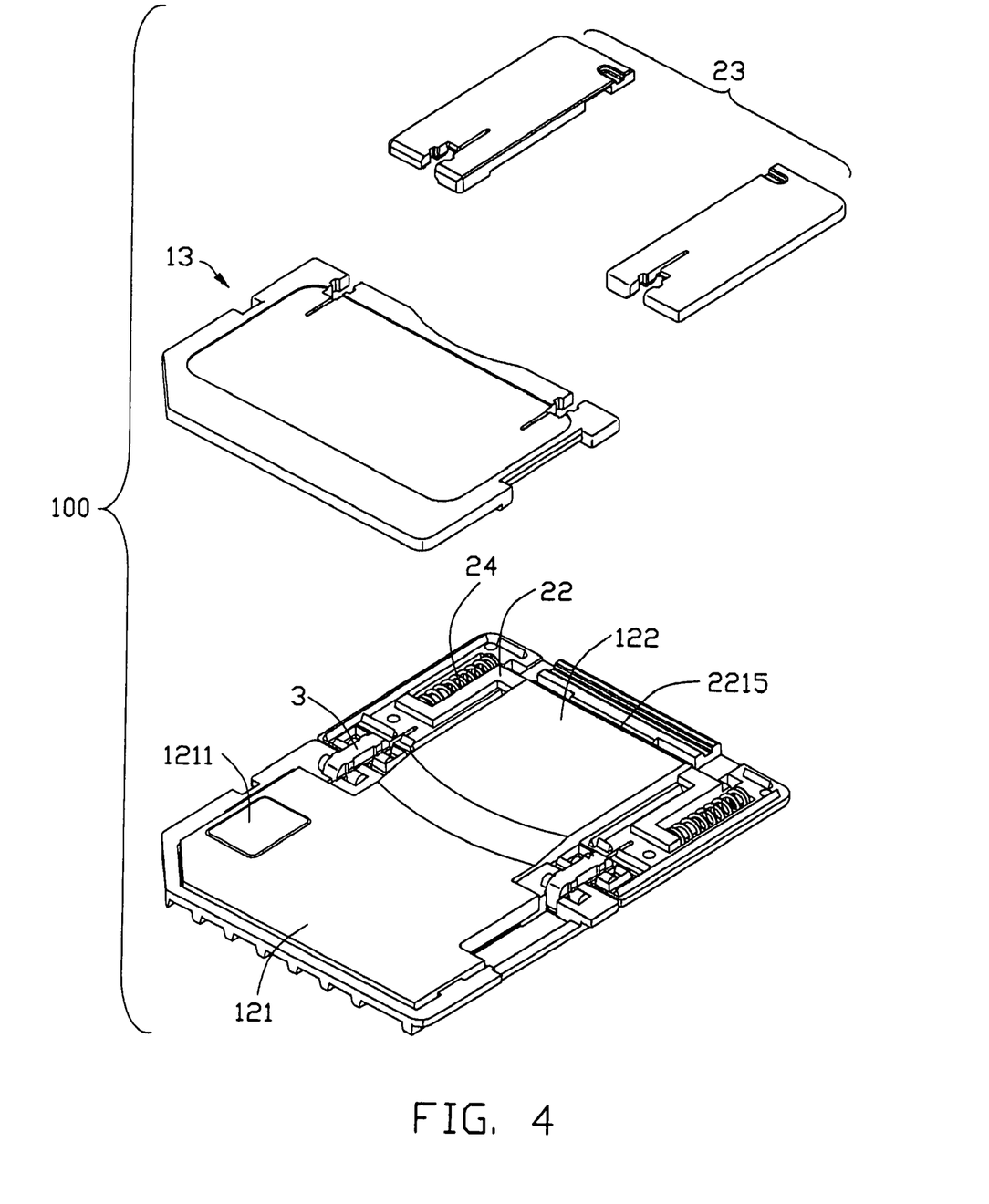
FIG. 4 is a perspective view of the memory card shown in FIG. 1 with a first and a pair of second covers removed therefrom.
Figure 7:
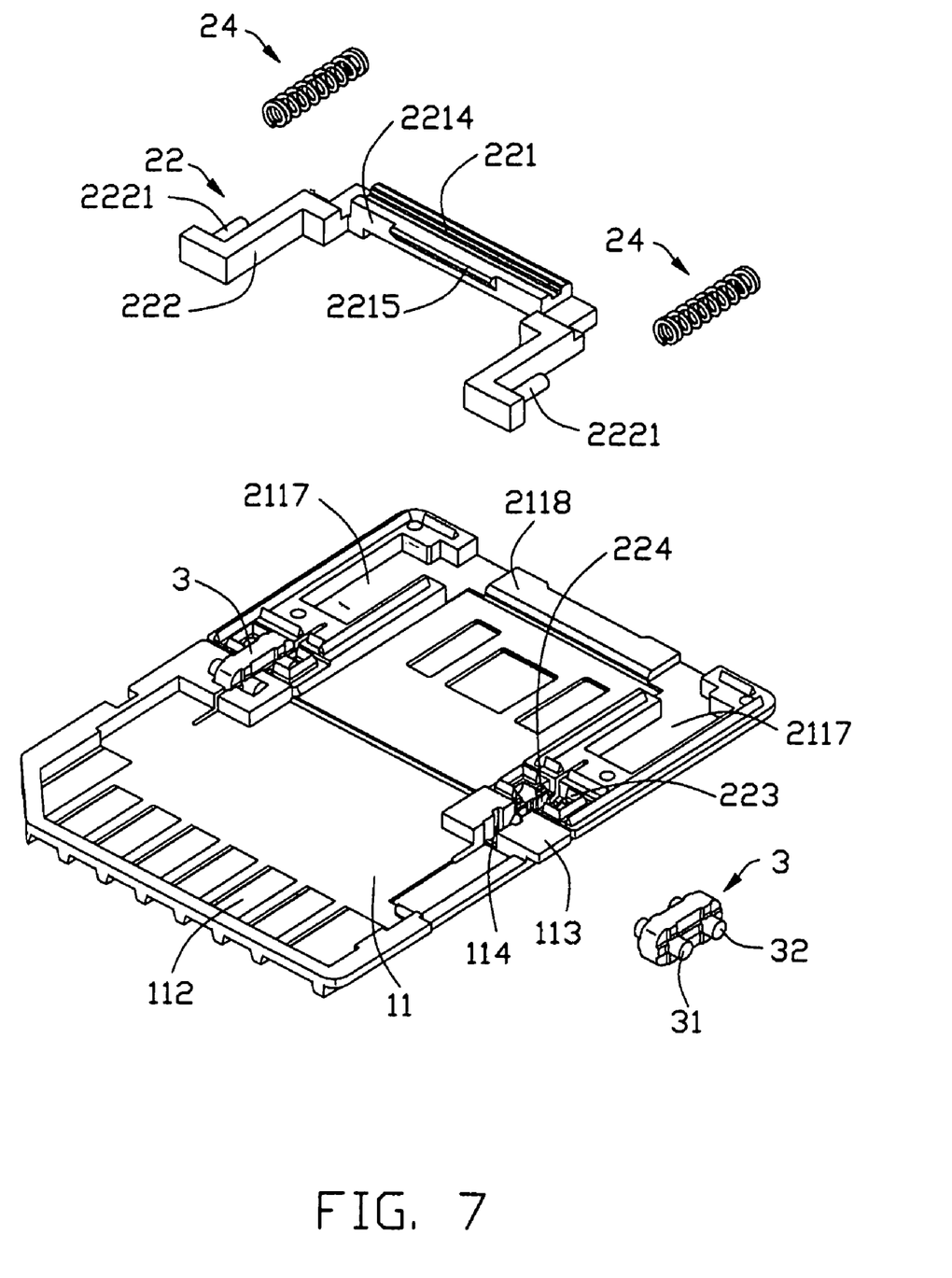
FIG. 7 is an exposed view of the memory card shown in FIG. 1 without the first and second covers as well as a PCB mounted thereon.
Figure 8:
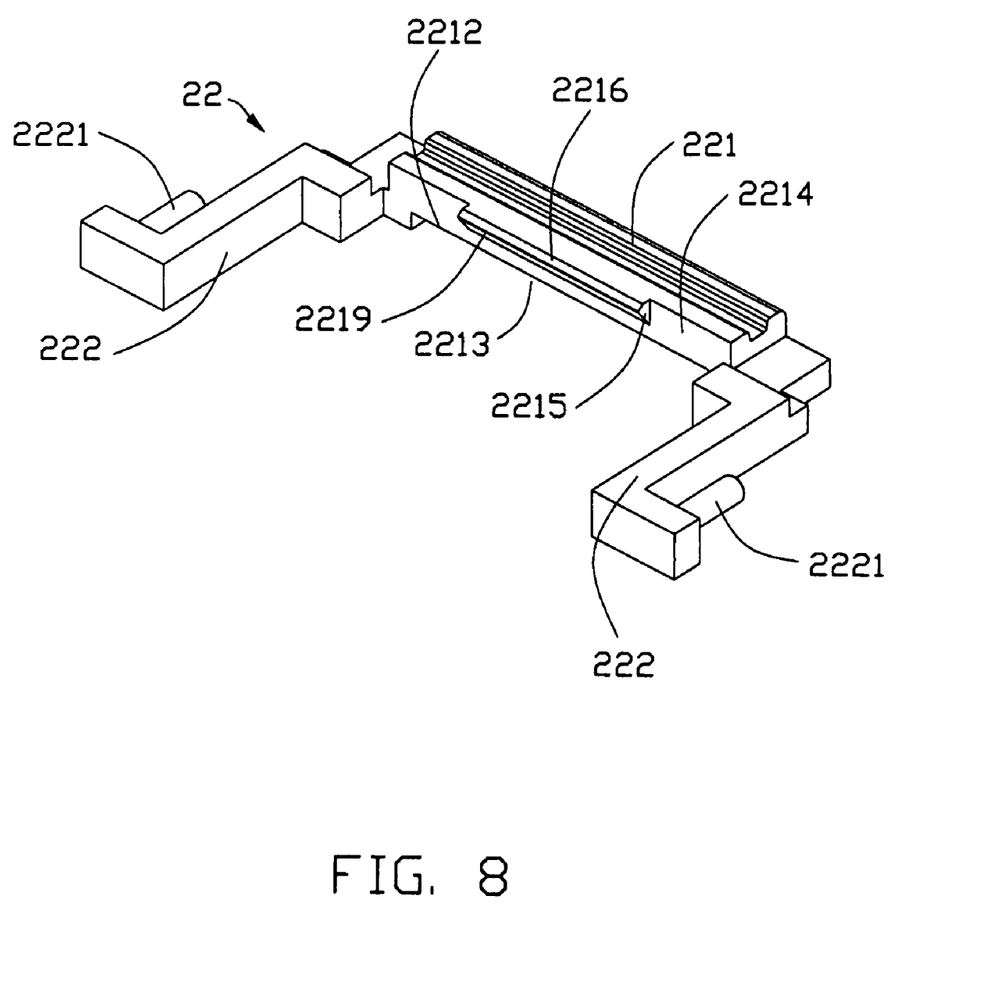
FIG. 8 is an enlarged view of a slider shown in FIG. 7.

Referring to FIGS. 7-9, in order to protect the second contacts 1221, a rotatable portion 2 is connected to the main body portion 11 so that it may be closed to cover the second contacts 1221 when they are not being used (the position of FIGS. 1-2) and opened to expose the second contacts 1221 when the extension 122 is inserted into a mating receptacle (the position of FIG. 3). The closed and opened positions are shown to be one-hundred eighty degrees apart. The rotatable portion 2 is attached to a back end surface (not labeled) of the main body portion 11 with the pair of respective hinges 3 and that allow for such rotation of the rotatable portion 2 by hand. The rotatable portion 2 comprises a second bottom cover 21, a slider 22 movably mounted on the second bottom cover 21, a pair of coiled springs 24 mating with the slider 22 and a pair of second top covers 23 covering the second bottom cover 21. The second bottom cover 21 comprises a second receiving chamber 211 for receiving the extension 122 and a pair of slots 2117 (referring to FIG. 7) on opposite lateral sides of the second receiving chamber 211. A rear outstanding 2118 is disposed at the back of the second receiving chamber 211. The slider 22 comprises a rear portion 221 and a pair of L-shaped extending portions 222 extending from opposite lateral sides of the rear portion 221. The extending portions 222 are movably received in the slots 2117 and each comprise a post 2221 for mating with the coiled springs 24. The rear portion 221 comprises a bottom surface 2212 with an opening 2213 recessed therein for mating with the outstanding 2118 and a front mating wall 2214 with a locking projection 2215 extending from an upper edge thereof for mating with the contractive portion 123 of the conductive member 12. The locking projection 2215 is contractive and comprises a top and a bottom slant walls 2216, 2219, wherein the surface of the bottom slant wall 2219 is much larger than that of the top slant wall 2216 in order to hold the extension 122 as shown in FIG. 9. A pair of second protrusions 223 each with a cross-shaped depression 224 defined therein are disposed at a front end of the slots 2117 of the second bottom cover 21 adjacent to the first protrusions 113 of the first bottom cover 11.

Each hinge 3 comprises a pair of first and second column-shaped pivots 31, 32 received in the depressions 114, 224, respectively. During movement of the rotatable portion 2 between its closed and opened positions, the hinge 3 can rotate about a first and a second axises extending across the first and second pivots 31, 32, respectively parallel to the width direction of the memory card 100.

In assembly, the coiled springs 24 and the slider 22 are retained in the second bottom cover 21. The L-shaped extending portions 222 are received in the slots 2117. One end of each coiled spring 24 encloses the post 2221 of the slider 22 and the other end of the coiled spring 24 is received in the slot 2117 as well to abut against the bottom cover 21. The first and second bottom covers 11, 21 are connected by the pair of hinges 23 with the first and second pivots 31, 32 received in the depressions 114, 224, respectively, as shown in FIG. 5. The conductive member 12 is mounted to the first and second bottom covers 11, 21. The base 121 and the extension 122 are received in the first and second receiving chambers 111, 211, respectively. The first contacts 1212 expose outside through the through holes 112 of the first bottom cover 11. The locking projection 2215 mates with the contractive portion 123 of the conductive member 12 so that the extension 122 can be retained in the second receiving chamber 211, which will be detailed hereinafter. The first and second top covers are assembled to the first and second bottom covers 11, 21, respectively.

The extension 122 with the plurality of second contacts 1221 defined thereon is a USB plug which is compatible with the USB specifications. The main body portion 11 with the base 121 of the conductive member 12 retained therein accords to an interface of the SD card standard, but its length is shortened so that the overall length of the memory card 100, with the rotatable portion 2 covering the USB plug at the closed position, accords to standard length of the SD card.

In use, when the rotatable portion 2 is closed, the bottom slant wall 2219 of the locking projection 2215 abuts against the upper slant wall 1231 of the contractive portion 123 and the second bottom cover 21 engages with the extension 122 so that the extension 122 can be stably retained in the second receiving chamber 211 as shown in FIG. 9. In this condition, the memory card 100 can be used as any SD card the same as if the USB plug did not exist. The memory card 100 can be inserted into and removed from receptacles of host devices that follow the SD card standard. However, when it is desired to insert the memory card 100 into a USB receptacle, the rotatable portion 2 is opened to expose the extension 122 and the second contacts 1221. In the rotatable process, the slider 22 is movable in the slots 1227 along the longitudinal direction by an engagement force between the contractive portion 123 and the locking projection 2215. The coiled springs 23 shrink and the rotatable portion 2 pivots around the first and second axises. As a result, the bottom slant wall 2219 of the locking projection 2215 slides away the upper slant wall 1231 of the contractive portion 123. When the memory card 100 is used to be inserted into a SD card receptacle, the top slant wall 2216 abuts against the lower slant wall 1232. The slider 22 is movable in the slots 1227 along the longitudinal direction. Afterwards, the bottom slant wall 2219 of the locking projection 2215 mates with the upper slant wall 1231 of the contractive portion 123. As a result, the extension 122 is held in the second receiving chamber 211 and the rotatable portion 2 is closed. According to the preferred embodiment of the present invention, when the rotatable portion 2 pivots around corresponding axises, the engagement between the contractive portion 123 and the locking projection 2215 is flexible via the movement of the slider 22 along the longitudinal direction of the memory card 100. Because the flexible engagement between the contractive portion 123 and the locking projection 2215, the USB plug can't be easily damaged so that the usage life of the memory card 100 is prolonged.

Various other details of the embodies can certainly be further altered so long as the contact structure at one end of the memory card 100 confirms to one standard and the contact structure at the other end conforms to a second standard. In other words, the first interface of the memory card is not limited to use with the SD card interface, such as one of the other memory cards described above can be utilized instead. Besides, the second interface is not limited to use with the USB plug, such as an IEEE-1394 plug and even other memory card interface can be instead too.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A memory card, comprising:
    a main body portion;
    a conductive member comprising a base retained in the main body portion with a plurality of first contacts defined thereon to form a first interface, and an extension extending beyond the main body portion with a plurality of second contacts to form a second interface; and
    a cover rotatably connected to the main body portion, the cover comprising a slot, an elastic member and a slider movably received in the slot, the elastic member comprising one end mating with the slider and the other end abutting against the slot, the slider comprising a locking projection, the locking projection engaging with a distal end of the extension at a closed position where the second interface is protected in the cover, and the locking projection disengaging from the distal end of the extension via a flexible deformation of the elastic member to allow the cover rotating away from the second interface and thus exposing the second interface.

2. The memory card according to claim 1, wherein the first interface is a standard memory card interface and the second interface is a universal serial bus (USB) or IEEE-1394 interface.

3. The memory card according to claim 1, wherein the first contacts are formed on a surface of the conductive member and expose outside.

4. The memory card according to claim 1, wherein the slider comprises a rear portion with the locking projection extending from a front wall thereof, the locking projection comprising a bottom slant wall to mate with an upper slant wall of the distal end of the extension at the closed position.

5. The memory card according to claim 4, wherein the rear portion and the cover comprises an opening and an outstanding mating with each other.

6. The memory card according to claim 4, wherein the locking projection comprises a top slant wall opposite to the bottom slant wall, the distal end of the extension comprising a lower slant wall abutting against the top slant wall when the cover returns to the closed position.

7. The memory card according to claim 6, wherein the surface of the upper slant wall and the bottom slant wall are larger than that of the lower slant wall and the top slant wall, respectively.

8. The memory card according to claim 1, wherein the slider slides in the slot along a longitudinal direction of the memory card.

9. The memory card according to claim 8, wherein the plurality of the first and second contacts are positioned apart from each other along the longitudinal direction such that they mate with a respectively one of first and second mating receptacles but not the other.

10. The memory card according to claim 8, wherein cover rotates around an axis extending across a width direction of the memory card perpendicular to the longitudinal direction.

11. The memory card according to claim 10, wherein the cover is connected to the main body portion by a pair of double-axis hinges, the hinges being rotatable around one axis on the main body portion and the other axis on the cover.

12. A memory card, comprising:
    a main body portion;
    a conductive member comprising a base retained in the main body portion with a plurality of first contacts defined thereon to form a first interface, and an extension extending beyond the main body portion with a plurality of second contacts to form a second interface, and wherein the extension is narrower than the base; and
    a cover rotatably connected to the main body portion, the cover comprising a slider sliding along a longitudinal direction of the memory card between a first position and a second position, the slider comprising a locking projection, the locking projection engaging with a distal end of the extension at the first position where the second interface is protected in the cover, and the locking projection disengaging from the distal end at the second position to allow the cover rotating away from the second interface and thus exposing the second interface.

13. The memory card according to claim 12, wherein cover comprises a bottom portion defining a pair of slots on lateral sides thereof and a pair of coiled springs, the slider comprising a pair of extending portions received in the slots with the coiled springs located between the extending portions and the slots.

14. The memory card according to claim 12, wherein the locking projection comprises a bottom slant wall to mate with an upper slant wall of the distal end of the extension at the first position.

15. The memory card according to claim 12, wherein a thickness of the extension is less than that of the base.

16. A memory card comprising:
    a shielding device including a moveable section and an immoveable section linked to each other wherein said moveable section can be moveable between a first position where the moveable section is essentially coplanar with the immoveable section, and a second position where the moveable section is essentially stacked upon the immoveable section;

a conductive member attached to the shielding device and including a first region having first conductive traces and located in the immoveable section, and a second region having second conductive traces and located in the moveable section; wherein both of said first conductive traces and said second conducive traces are exposed to an exterior when said moveable section is in located in the first position while only the second conductive traces is exposed when the moveable section is located in the second position.

* * * * *